| United States Patent [19] | [11] 3,948,873 |
|---|---|
| Hudgin | [45] Apr. 6, 1976 |

[54] PROCESS FOR PREPARING CARBON MONOXIDE-ETHYLENE COPOLYMERS

[75] Inventor: Donald E. Hudgin, Princeton Junction, N.J.

[73] Assignee: Atlantic Richfield Company, Los Angeles, Calif.

[22] Filed: Oct. 10, 1974

[21] Appl. No.: 513,619

[52] U.S. Cl. ................ 260/94.9 B; 260/63 CQ
[51] Int. Cl.² ............................ C08F 210/02
[58] Field of Search ............ 260/63 CQ, 94.9 B

[56] References Cited
UNITED STATES PATENTS

| 3,083,184 | 3/1963 | Loeb | 260/63 |
| 3,530,109 | 9/1970 | Fenton | 260/94.9 |
| 3,689,460 | 9/1972 | Nozaki | 260/63 CQ |
| 3,694,412 | 9/1972 | Nozaki | 260/63 CQ |
| 3,780,140 | 12/1973 | Hammer | 260/884 |
| 3,835,123 | 9/1974 | Nozaki | 260/94.9 B |

Primary Examiner—Lester L. Lee
Attorney, Agent, or Firm—Coleman R. Reap

[57] ABSTRACT

An improved method of preparing ethylene-carbon monoxide copolymers using organic peroxide catalysts comprising carrying out the polymerization in the presence of a small amount of potassium dihydrogen phosphate.

10 Claims, No Drawings

PROCESS FOR PREPARING CARBON MONOXIDE-ETHYLENE COPOLYMERS

BACKGROUND OF THE INVENTION

RELATED CASE

U.S. application Ser. No. 501,524 filed Aug. 29, 1974 discloses certain aspects of the present invention.

This invention relates to ethylene-carbon monoxide and more particularly to an improved process for preparing ethylene-carbon monoxide copolymers.

Ethylene-carbon monoxide copolymers have been known for several years and have been of considerable interest because of their potential value as engineering plastics. Ethylene-carbon monoxide copolymers having high carbon monoxide contents, particularly 40% or more, are especially interesting because they possess high melting points and other superior properties which would make them very suitable for many engineering applications. Ethylene-carbon monoxide copolymers are also of interest since carbon monoxide is a very inexpensive by-product obtained in the manufacture of steel and is, therefore, unlike most other monomeric materials used in the production of synthetic polymers, not solely derived from petroleum. In spite of the great potential of these copolymers, their development has been slow and they have not yet gained commercial acceptance. The principal reason for this is that no commercially feasible process for their production has been developed.

The preparation of high molecular weight ethylene carbon-monoxide copolymers has been accomplished by gamma radiation initiation but this method requires the use of expensive equipment, high pressures, and inordinantly long reaction times. Furthermore, polymer produced by this method may be partially cross-linked and, thus, very difficult to process. Since chemical catalysis offers more advantages and fewer hazards than radiation initiation, considerable effort has been made to develop useful chemical catalytic processes for the production of ethylene-carbon monoxide copolymers.

Among the more promising chemical catalytic processes for the preparation of these polymers are those employing organic peroxide compounds as catalysts. U.S. Pat. No. 2,495,286, issued to Brubaker, is typical of the patents which disclose the use of organic peroxides as catalysts for the preparation of ethylene-carbon monoxide copolymers. One of the drawbacks of the use of organic peroxide compounds as catalysts in the preparation of ethylene-carbon monoxide copolymers is that the total polymer yield is often quite low. Since low yield reduces the feasibility of commercial processes, it would be highly desirable to develop a process for preparing high melting ethylene-carbon monoxide copolymers based on the use of organic peroxide catalysts in which product is obtained in high yield.

SUMMARY OF THE INVENTION

An improved process for preparing ethylene-carbon monoxide copolymers has now been discovered by which polymeric product can be produced in good yields.

Accordingly, it is an object of the invention to present an improved process for preparing ethylene-carbon monoxide copolymers. It is another object of the invention to present an improved process for preparing ethylene-carbon monoxide by means of organic peroxide catalysts. It is another object of the invention to present a process for preparing ethylene-carbon monoxide in improved yields. These and other objects will become more readily apparent from the following description and examples.

The above objects are accomplished by copolymerizing ethylene and carbon monoxide in the presence of an organic peroxide catalyst and a small amount of potassium dihydrogen phosphate.

DESCRIPTION OF THE INVENTION

The reaction between the ethylene and the carbon monoxide may be carried out under batch or continuous conditions but for convenience the invention will be described as it applies to a batch type process. The reaction is preferably carried out in a reaction vessel which can withstand high pressures and the corrosive effects of carbon monoxide. Stainless steel or glass lined reactors are generally considered to be suitable materials for the inside surfaces of the reactor.

The potassium dihydrogen phosphate is preferably added to the reaction mixture prior to the reaction. If desired, some or all of the potassium dihydrogen phosphate may be added in one or more increments during the polymerization reaction. Amounts of about 0.1 to 20%, based on the total weight of monomeric components in the reaction mixture, are effective in producing the desired results. In a preferred embodiment the amount of potassium dihydrogen phosphate used varies from about 1 to 10%, based on the total weight of monomers present. Although the particle size of the potassium is not deemed to be critical, it has been observed that fine particle sized potassium dihydrogen phosphate, such as less than about 100 mesh (U.S. Standard), increases the yield of polymer obtained.

In a typical operation for preparing ethylene-carbon monoxide copolymer by the improved process of the invention, a solvent, if one is used, is added to the reaction vessel and an inert gas, such as nitrogen, is passed through the reactor to remove oxygen. The organic peroxide catalyst, the potassium dihydrogen phosphate, and any desired polymerization modifiers or other additives are then introduced into the reaction vessel. The vessel is then closed and pressured with an ethylene-carbon monoxide gas mixture. Heat is then applied to the reaction vessel to initiate the reaction and the vessel contents are heated to and maintained at a temperature and pressure within the desired range until the reaction is completed. The pressure is conveniently maintained by introducing additional ethylene and carbon monoxide from time to time as they are used up in the reaction. When the polymerization is completed, the reactor contents are cooled and the solvent is separated from the polymer by any desired method, for example, by distillation, and the polymeric product is recovered.

The ratio of ethylene to carbon monoxide in the reaction vessel may vary depending upon the type of product being prepared. When preparing copolymers with substantial carbon monoxide contents, the weight ratio of ethylene to carbon monoxide is desirably maintained in the range of about 4:1 to 1:4. The gas charge may contain inert gases such as nitrogen which serve as a gaseous diluent or it may contain only ethylene and carbon monoxide. In the latter case the gas charge preferably contains about 80 to 20% ethylene and about 20 to 80% carbon monoxide. The ratio of ethylene and carbon monoxide may be varied as the polymerization reaction proceeds, if desired. In this way the constitution of the polymer chains can be varied.

Other ethylenically unsaturated monomers which polymerize with ethylene and/or carbon monoxide can be included in the reaction mixture formulation to modify the properties of the polymeric product. Includable as suitable additional monomers are alkenes containing 3 to 8 carbon atoms, such as propylene, isobutylene, hexene, etc.; cycloaliphatic compounds, such as cyclohexene, etc., aromatic substituted alkenes, such as styrene, etc., acrylic compounds, such as acrylic or methacrylic acid, acrylonitrile, etc.; vinyl esters, such as vinyl acetate, etc.; vinyl halides, such as vinyl chloride, vinylidene chloride, etc.; dienes, such as butadiene, isoprene, 2-chloro-butadiene, etc. The amount of other polymerizable monomer or monomers used in the ethylene-carbon monoxide reaction mixture will be determined by the properties desired in the product. In general, if other polymerizable monomeric compounds are included in the formulation, it is preferred to limit the quantity of such other compounds to minor amounts such as up to about 45% based on the total weight of monomeric components present in the reaction mixture.

The catalysts used in the process of the invention are the organic peroxides including the peroxy dicarbonates. The preferred catalysts are those having a ten hour halflife temperature of about 60°C. or less. Exemplary of suitable catalysts are diacetyl peroxide, dilauroyl peroxide, dibenzoyl peroxide, t-butyl peroxy acetate, t-butyl peroxy pivalate, dicumyl peroxide, dicyclohexylperoxy dicarbonate, and dicetylperoxydicarbonate. The preferred classes of organic peroxides are the peroxy ester compounds including the monoperoxy esters, such as t-butyl peroxy pivalate, etc.; and the diperoxy esters, such as 2,3-dimetyl-2,3-di(pivaloyl peroxy)butane, and the peroxydicarbonates, such as dicyclohexylperoxydicarbonate and dicetylperoxydicarbonate.

The catalyst concentration may vary depending upon the properties desired in the product and the temperature at which the reaction is to be carried out. In general, the catalyst is effective at concentrations as low as about 0.005% based on the total weight of polymerizable monomer present and amounts up to about 5% or more will produce the desired result. It is preferred to use the catalyst at a concentration of about 0.1 to 2%, based on the total weight of polymerizable monomer present in the reaction mixture.

A cocatalyst may be used, if desired, in conjunction with the peroxy ester catalyst. The useful concentration of the cocatalyst often varies from about 0.01 to 5.0% and it is preferably used in the range of about 0.1 to 2% based on the total weight of polymerizable monomers present in the reaction mixture. Suitable cocatalysts include other free radical compounds, such as other organic peroxides and azo compounds, such as 2,2'-azobis(isobutyronitrile), etc.

Solid ethylene-carbon monoxide copolymers may be prepared at pressures as low as about 300 psig using peroxide catalysts. In general, it has been observed that higher molecular weight polymers are obtained by carrying out the reaction at higher pressures and, accordingly, pressures as high as 3000 atmospheres or higher can often be used to advantage.

The temperature at which the reaction is desirably carried out will vary depending upon the other reaction conditions and the type of product desired. The use of tertiary peroxy esters of organic acids having 10 hour halflives of about 60°C. or less permits the use of lower temperatures than is desirable when using other less active peroxide catalysts. With other peroxide catalysts, the desired reaction temperature may reach 150°C. or higher. The temperature is desirably maintained between about 20° and 100°C. and most preferably between about 20° and 70°C. during the polymerization reaction since more gell-free higher molecular weight polymers are obtained at lower temperatures.

The reaction may be carried out either in the presence of or the absence of a solvent or diluent for the reactants. In general, it is preferable to use a solvent or diluent to prevent local heat buildup and to reduce the viscosity of the polymerizing mass. Solvents or diluents used are desirably volatile so that they can be more easily removed from the polymeric product. Suitable solvents and diluents include aliphatic, cycloaliphatic, and aromatic hydrocarbons, such as isooctane, cyclohexane, benzene, etc.; ethers, such as dioxane, propylene oxide, etc.; and other organic or inorganic liquids which are free of substituents or impurities which interfere with the desired reaction between the ethylene and the carbon monoxide. Two or more solvents and/or diluents can be used in combination in the process of the invention. In a preferred embodiment of the invention, a cyclic ether is used as the solvent. Particularly preferred cyclic ethers are dioxane and propylene oxide. As stated above, the cyclic ether can be used in combination with other solvents or diluents.

Other additives, such as plasticizers antioxidants, molecular weight regulators, coloring agents fillers, lubricants, etc. may be incorporated into the formulation prior to, during or subsequent to the polymerization reaction. It is usually more efficient and economical to incorporate fillers and other inert materials into the polymerized product in a post polymerization blending operation.

The following examples illustrate preferred embodiments of the invention. Unless otherwise indicated, parts and percentages are on a weight basis.

EXAMPLE I

A 1 liter Parr Instrument Company reactor (Model 4521) is charged with 500 ml. propylene oxide and 1 gram of dicyclohexylperoxydicarbonate. The reactor is sealed and purged with prepurified nitrogen. The reactor is then pressurized with a purified 50/50 carbon monoxide/ethylene mixture to 950 psig. With stirring, the temperature is raised to 24°C. For 25 hours and 20 minutes, the temperature is maintained between 24° and 33°C. while the pressure is maintained between 950 and 660 psig by periodically repressurizing with the gas mixture. The reactor is cooled to 15°C. and is then depressurized. The propylene oxide is evaporated, leaving 28.5 grams of copolymer, having a melting range 210°–215°C.

EXAMPLE II

The procedure of Example I is repeated except that 3 grams of potassium dihydrogen phosphate is added to the reaction mixture prior to reaction. The reaction is carried out for 19 hours at a pressure range of 670 to 1270 psig and a temperature range of 24°–44°C. The copolymer product obtained is white; is obtained at a yield of 74.8 grams; and has a melting range of 210°–215°C.

EXAMPLE III

The procedure of Example II is repeated except the potassium dihydrogen is ground to pass through a 200 mesh screen. The copolymer product weighs 79.7g., and has a melting range of 205° to 210°C.

EXAMPLE IV

The procedure of Example II is repeated except that the dicyclohexylperoxydicarbonate is replaced by t-butyl peroxypivalate. The polymeric reaction product will be obtained in good yield.

Examples II to IV illustrate specific embodiments of the invention. These examples show that when potassium dihydrogen phosphate is added to an ethylene-carbon monoxide reaction mixture containing a peroxide catalyst the product yield is markedly increased. Example III further illustrates the advantage of using potassium dihydrogen phosphate of small particle size.

Although the invention has been described with particular reference to specific examples, the scope of the invention is not limited thereto but is defined by the breadth of the appended claims.

I claim:

1. In a process for preparing ethylenecarbon monoxide copolymers by reacting a mixture of ethylene and carbon monoxide at a temperature of about 20° to 150°C and a pressure of at least about 300 psig, the improvement comprising carrying out the reaction in the presence of an organic peroxide catalyst present in an amount effective to produce the desired product and 0.1 to 20% of $KH_2PO_4$ based on the total weight of monomeric components present in the reaction mixture.

2. The process of claim 1 wherein the $KH_2PO_4$ is present in an amount of about 1 to 10%, based on the total weight of monomeric components present.

3. The process of claim 1 wherein the organic peroxide catalyst is an organic acid peroxy ester having a 10 hour halflife not greater than about 60°C.

4. The process of claim 3 wherein said organic acid peroxy ester is t-butyl peroxy pivalate.

5. The process of claim 1 wherein the reaction is carried out in the presence of a solvent which is free from substituents which interfere with the desired reaction between the ethylene and the carbon monoxide.

6. The process of claim 5 wherein the solvent is a cyclic ether.

7. The process of claim 1 wherein at least one additional ethylenically unsaturated monomer which polymerizes with ethylene or carbon monoxide or mixtures thereof is added to the reaction mixture.

8. The process of claim 1 wherein the reaction is carried out at a temperature of about 20° to 100°C.

9. The process of claim 1 wherein the ratio of ethylene to carbon monoxide in the reaction mixture is about 1:4 to 4:1.

10. The process of claim 1 wherein the average particle size of the potassium dihydrogen phosphate is less than about 100 mesh.

* * * * *